(12) United States Patent
Robinson et al.

(10) Patent No.: US 8,723,511 B2
(45) Date of Patent: May 13, 2014

(54) ABSOLUTE ENCODER

(75) Inventors: David T. Robinson, Lebanon, NH (US); Walter Wyss, Zollikerberg (CH)

(73) Assignee: Nidec Avtron Automation Corporation, Independence, OH (US)

( * ) Notice: Subject to any disclaimer, the term of this patent is extended or adjusted under 35 U.S.C. 154(b) by 256 days.

(21) Appl. No.: 13/094,355

(22) Filed: Apr. 26, 2011

(65) Prior Publication Data
US 2011/0260716 A1 Oct. 27, 2011

Related U.S. Application Data

(60) Provisional application No. 61/327,916, filed on Apr. 26, 2010.

(51) Int. Cl.
*G01D 5/244* (2006.01)
(52) U.S. Cl.
USPC ............ 324/207.22; 250/231.18; 324/207.2
(58) Field of Classification Search
USPC ............ 324/207.2, 207.21, 207.25, 160–171; 250/231.13–231.14
See application file for complete search history.

(56) References Cited

U.S. PATENT DOCUMENTS

| | | | |
|---|---|---|---|
| 5,019,776 A * | 5/1991 | Kawamata et al. | 324/207.12 |
| 5,506,579 A | 4/1996 | Spaulding | |
| 6,043,768 A | 3/2000 | Strasser et al. | |
| 6,084,400 A | 7/2000 | Steinich et al. | |
| 6,232,594 B1 | 5/2001 | Eccher et al. | |
| 6,452,159 B2 | 9/2002 | Holzapfel et al. | |
| 6,552,534 B2 * | 4/2003 | Desbiolles et al. | 324/207.25 |
| 6,806,461 B2 | 10/2004 | Strasser et al. | |
| 6,931,918 B2 * | 8/2005 | Herb | 73/114.26 |
| 6,950,769 B2 | 9/2005 | Ito et al. | |
| 7,030,605 B2 | 4/2006 | Schwabe et al. | |
| 7,291,832 B2 | 11/2007 | Muenter | |
| 7,301,031 B2 | 11/2007 | Rozzell, Jr. et al. | |
| 7,368,705 B2 | 5/2008 | Hare et al. | |
| 7,385,389 B2 | 6/2008 | Tahara et al. | |
| 2004/0164732 A1 * | 8/2004 | Taniguchi et al. | 324/207.22 |
| 2009/0102461 A1 * | 4/2009 | Santos et al. | 324/207.2 |
| 2010/0141244 A1 | 6/2010 | Bartos et al. | |

OTHER PUBLICATIONS

Int'l Search Report—3pgs., Jan. 2, 2012, Avtron Industrial Automation, Inc.

* cited by examiner

*Primary Examiner* — Arleen M Vazquez
*Assistant Examiner* — Brent J Andrews
(74) *Attorney, Agent, or Firm* — Tarolli, Sundheim, Covell & Tummino LLP

(57) ABSTRACT

Systems and methods for implementing an absolute encoder are disclosed. A system can include a plurality of tracks, each having a plurality of track elements. Track elements for at least one of the tracks are configured with a nonlinear modulation, such that an absolute position can be determined without requiring a reference marker.

22 Claims, 5 Drawing Sheets

ABSOLUTE ENCODER

CROSS-REFERENCE TO RELATED APPLICATION

This application claims the benefit of U.S. Provisional Patent Application No. 61/327,916, filed Apr. 26, 2010 and entitled Absolute Encoder, which is incorporated herein by reference in its entirety.

TECHNICAL FIELD

This disclosure relates generally to a system and method to implement an absolute encoder.

BACKGROUND

Position detectors are utilized for controlling operation of electrical machines such as motors and generators. There are two main types of encoders: absolute and incremental. As an example, a rotary encoder converts angular position or motion of a shaft to a corresponding analog or digital code. The output of incremental encoders provides information about the motion of the shaft. Absolute rotary encoders are implemented to provide an indication of the current angular position of the shaft. Rotary encoders are used in many applications that require precise and unlimited rotation, such as including industrial controls, robotics, and rotating platforms. Linear encoders are used to encode position along a path. Linear encoders are utilized in metrology instruments (e.g., for semiconductor processing), motion systems and high precision machining tools.

SUMMARY

The present disclosure relates to systems and methods of implementing an absolute encoder.

In one embodiment, a system can include a plurality of tracks configured to move relative to a longitudinal axis. Each of the plurality of tracks includes a plurality of track elements arranged along each respective track. The plurality of track elements for at least one modulated track of the plurality of tracks is configured with a nonlinear modulation. At least one sensor is positioned adjacent to each of the plurality of tracks for detecting the track elements, each given sensor being configured to provide a respective sensor signal corresponding to at least one of position or movement of the respective track elements relative to the given sensor. An indication of absolute position can be computed based on the sensors signals.

Another embodiment provides a method for determining absolute position. A first sensor signal is received from a first sensor arranged for detecting one of rotation or position of track elements arranged on a first track that is coupled for rotation with a shaft. A second sensor signal is received from a second sensor arranged for detecting one of rotation or position of track elements arranged on a second track that is coupled for rotation with the shaft, the track elements of at least one of the first and second tracks exhibiting a nonlinear modulation along a corresponding surface that is facing the respective sensor. An indication of the absolute angular position of the shaft is computed based on the received first and second sensor signals.

DESCRIPTION OF EXAMPLE EMBODIMENTS

An absolute encoder is disclosed that includes a plurality (e.g., two or more) of tracks, each having a plurality of track elements. Track elements for at least one of the tracks are configured with a nonlinear modulation. Track elements for at least one other of the tracks can include no modulation. An absolute angular position can be calculated from sensing relative movement of the track elements. For purposes of simplicity of explanation and not by way of limitation, the following example embodiments will be explained in the context of a rotary absolute encoder. However, it will be appreciated that tracks and the modulation scheme could also be implemented as part of an absolute linear encoder based on the teachings herein.

Figure 1:
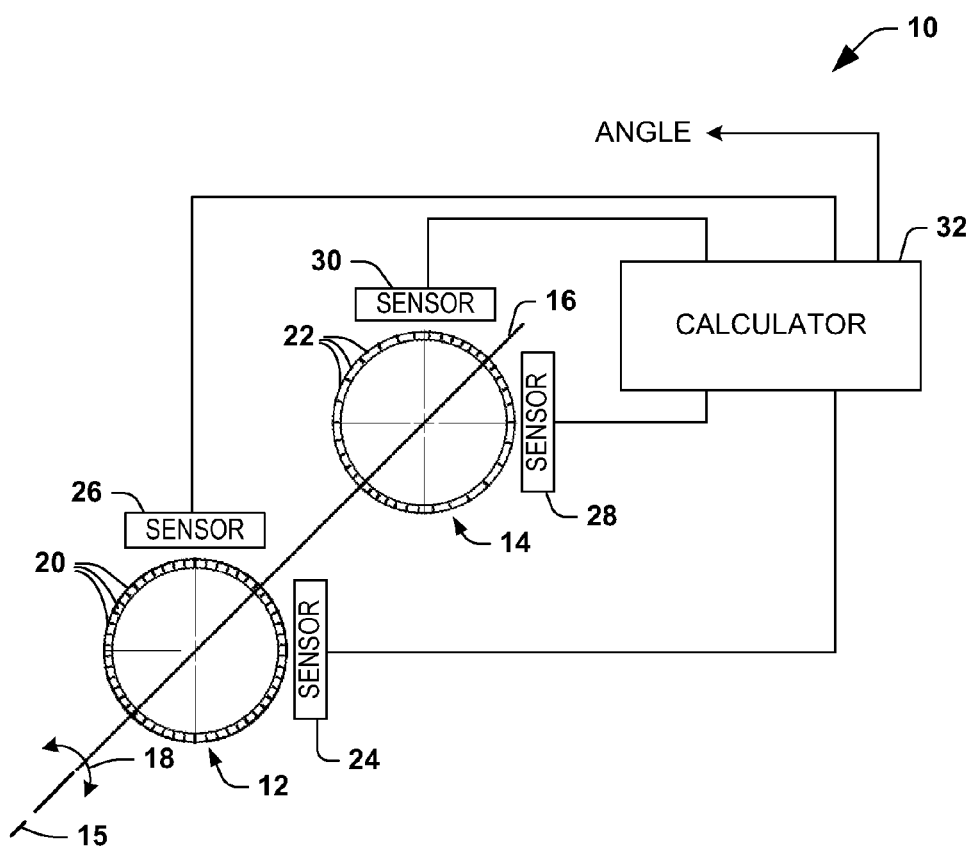
FIG. 1 depicts an example embodiment of an encoder system.

FIG. 1 depicts an example of a rotary encoder system 10 that can be implemented. The system 10 includes plurality of (e.g., two or more) tracks 12 and 14. Each of the tracks 12 and 14 rotates relative to an axis 15 that extends longitudinally through a rotary shaft, schematically indicated at 16. Thus, each of the tracks 12 and 14 rotates about the axis 15 in a direction, indicated by an arrow 18, which is commensurate with rotation of the shaft 16. It will be understood and appreciated that the shaft 16 can rotate in either direction about the axis 15. The rotation of the shaft 16, for example, can be caused by a motor or other external source of rotational force that is applied to the shaft, directly or indirectly. The direction and speed of angular rotation of the shaft 16 can vary according to the application requirements.

Each of the tracks 12 and 14 includes respective track elements 20 and 22 disposed on a surface thereof. For the example of a rotary encoder, as demonstrated in FIG. 1, the surface where the track elements 20 and 22 reside can be a radially outer (e.g., circumferential) surface of a disc or wheel that forms respective tracks 12 and 14. Alternatively, the surface where the track elements reside could be an axial end or side surface in which the track elements are disposed in an annular arrangement, such as at a predetermined radius from the central axis 15. The track elements 20 and 22 are continuously positioned on its track surface. There can be any number of track elements 20 and 22 for each respective track. As will be appreciated, a greater number of track elements provides for greater encoder resolution. Since the tracks 12 and 14 and their associated track elements 20 and 22 are fixed relative to the shaft, the corresponding track elements 20 and 22 rotate commensurately with rotation of the shaft.

At least one of the sets of track elements is modulated relative to the other set of track elements by a nonlinear modulation. As an example, each of the tracks 12 and 14 can include the same number of track elements 20 and 22, however, one of the sets of track elements 22 can be modulated nonlinearly in a predetermined manner (e.g., one modulation period) over one mechanical revolution (360° m). That is, the track elements 22 on the modulated track 14 have a circumferential dimension (e.g., arc length) that varies with respect to the corresponding dimensions of track elements 20 in the track 12 in a nonlinear manner. The nonlinear modulation can be implemented such that the track elements are initially synchronized (e.g., at 0° m) then, as the shaft 16 rotates, the modulation varies the circumferential dimension of the track elements 22 nonlinearly over a complete mechanical revolution (i.e., 360° m) until the shaft has rotated back to 0° m.

As a further example of a modulation scheme, the track elements 20 and 22 on each of the tracks 12 and 14 can be modulated so as to provide for a predetermined nonlinear modulation between the tracks. For instance, one set of the track elements 20 can be implemented with a sinusoidal modulation and the other track elements 22 can be implemented with a cosinusoidal modulation, each synchronized with respect to a mechanical starting point (e.g., corresponding to 0° m). Each of the tracks 12 and 14 can have the same number of track elements.

In order to detect the modulation of the track elements 20 and 22, the system 10 includes at least one sensor positioned adjacent to each of the tracks 12 and 14, respectively. The sensors can be connected to a housing or other support structure as to remain in a fixed position, such that the track elements rotate past the sensors according to rotation of the shaft 16.

In the example of FIG. 1, sensors 24 and 26 are positioned in a quadrature relationship (e.g., 90 mechanical degrees (90° m)) with respect to each other and are positioned for sensing the track elements 20 of the track 12. Similarly, sensors 28 and 30 are positioned adjacent to track elements 22 of the track 14, and are also arranged in a quadrature relationship, and are configured for sensing the track elements. While the sensor pairs 24, 26 and 28, 30 are demonstrated as being angularly displaced by 90° m, it will be appreciated that other angular relationships (e.g., 30° m, 60° m, 120° or the like) can be implemented between each respective sensor pair on each track 12 and 14. However, for simplicity of explanation, the sensors 26 and 30 will be described as quadrature sensors arranged in a quadrature position from the reference sensors 24 and 28, although not being limited to 90° m. Each of the sensors 24, 24, 26 and 26 is positioned at a distance sufficient to sense the track elements, which distance may vary depending on the encoder technology being utilized in the system 10. Each of the sensors 24, 24, 26 and 26 thus operates as a transducer that provides a sensor signal corresponding to detecting position, movement or both position and movement of the respective track elements 20 and 22.

The track elements 20 and 22 and associated sensors 24, 26, 28 and 30 for each track can be configured according to a variety of different encoder technologies, such as optical, magnetic, mechanical or a combination of any such technologies. Thus, the encoder systems and methods disclosed herein can be considered technology agnostic since they can be implemented for any such technology. The type of information contained in the sensor signal thus will vary depending on the technology utilized for the track elements and the sensors. Each of the sensors 24, 26, 28 and 30 thus provide means for sensing position or movement of track elements 20 and 22 of a first and second track and for providing respective signals representing position or movement of the track elements.

As an example, the track elements 20 and 22 can be implemented as magnets of alternating polarity arranged circumferentially along a surface that is fixed to the shaft. For instance, the track elements 20 and 22 can be formed of magnetized material that is attached to a cylindrical disc, which is coupled to the shaft 16. Alternatively, the magnets can be affixed directly on a surface of the shaft 16. The arc length (e.g., radially outer extent) of each pole (e.g., track element) that is adjacent to respective sensors 24, 26, 28 and 30 can vary with a desired modulation over the circumferential surface (e.g., decreasing in length over a first angular portion and then increasing in length over a next angular portion). For the example of magnetic encoder technology, the sensors 24, 26, 28 and 30 can be Hall Effect sensors or magneto-resistive (MR) sensors arranged to detect the magnetic field provided by the outer surface track elements 20 and 22. As described herein, the sensors 24, 26, 28 and 30 provide corresponding sensor signals that can be utilized to detect the absolute angular position and/or rotation of the shaft.

By way of further example, the track elements 20 and 22 may be implemented in a mechanical technology, such as gear teeth. The gear teeth corresponding to the track elements 20 and 22 can be sensed via the sensors 24, 26, 28 and 30 (e.g., Hall Effect sensors).

As yet another example, the track elements 20 and 22 and corresponding sensors 24, 26, 28 and 30 can be implemented using optical technology. Each of the sensors 24, 26, 28 and 30 can thus include an optical transmitter that emits a light onto the rotating surface where the track elements are disposed and an optical sensor (e.g., photodiode) detects the changes in reflected light, corresponding to shaft rotation. For instance, the track elements 20 and 22 can be implemented as alternating transparent and opaque elements disposed along the circumferential surface of the shaft 16 or circumferential structure attached around the shaft. Alternatively, the optical track elements can be implemented as alternating reflective and non-reflective elements on the surface of the shaft. Another type of optical encoder technology employs slits that can be formed along the circumference of a metal or glass disc onto which a beam of light is provided.

Regardless of the technology utilized to implement the track elements 20 and 22 and associated sensors 24, 26, 28 and 30, the sensors provide sensor signals to a calculator 32. The calculator 32 is configured to determine an absolute angle of rotation for the shaft based on the sensor signals. The calculator 32 can be implemented as hardware (e.g., analog circuitry and/or digital circuitry, such as an arithmetic logic unit (ALU)), software (e.g., computer executable instructions executed by a processor), or as a combination of hardware and software configured to compute an absolute angular position based on the information provided by the sensors. The calculator thus provides means for computing an indication of absolute position. The computations performed by the calculator 32 will vary depending on the nonlinear modulation implemented in the respective tracks and whether one or more of the tracks employs such non-linear modulation.

The calculator 32 can provide the angle in any desired format, such as according to a known protocol, including any one or more public, proprietary or yet to be developed protocols. Some examples of protocols that the calculator 32 can implement include parallel binary, Synchronous Serial Interface (SSI), "BiSS" (published as an open source protocol by iC-Haus GmbH of Bodenheim, Germany), ISI, Profibus (Process Field Bus), Controller Area Network (CAN), DeviceNet, CANopen, Endat, and Hiperface. The calculator 32 can be selectively programmed (e.g., in response to a user input) to provide its output in a format according to any of such protocols.

As a further example, analog-to-digital converters can convert the sensor signals to corresponding digital signals having respective digital codes (e.g., values). The calculator 32 can be programmed and/or configured to compute an electrical angle based on the sensor signal detected for each of the respective track elements. Because the relative modulation is known and quantifiable mathematically, the calculator 32 can aggregate the computed electrical angles to determine an absolute angular position of the shaft (e.g., a mechanical angle). Thus, the angular position can be provided as a substantially real time output signal. The calculator 32 thus can determine the absolute angular position of the shaft 16 without having to employ an absolute reference marker for detecting an absolute position.

Figure 2:
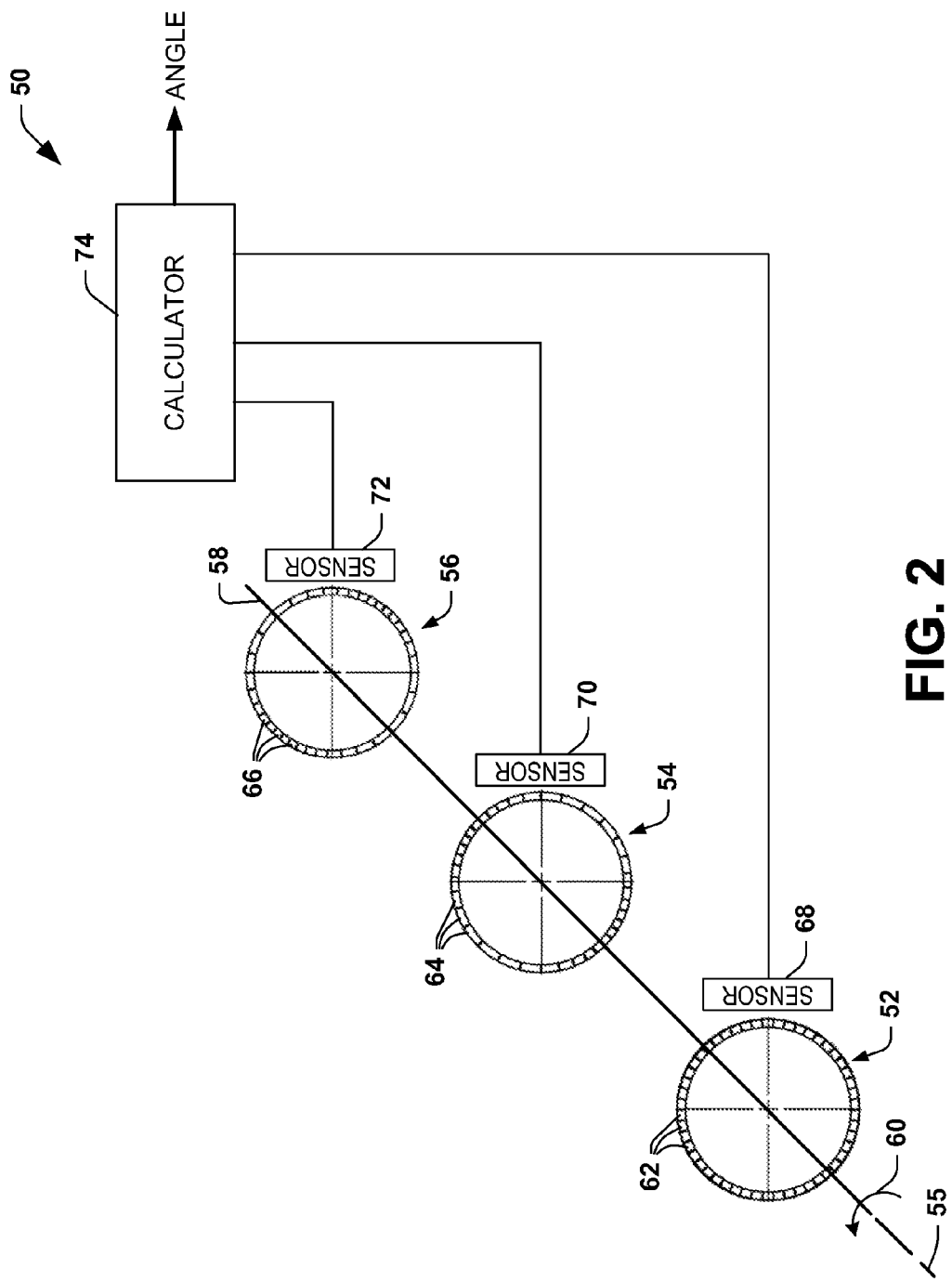
FIG. 2 depicts another example embodiment of an encoder system.

FIG. 2 depicts another example of an encoder system 50 that can be implemented. The system 50 is configured to determine an absolute angular position of a shaft 58 that can rotate in a direction 60 about its longitudinal axis 55. The example system 50 of FIG. 2 is similar in configuration to the system 10 of FIG. 1 but includes three tracks 52, 54 and 56. Each of the tracks 52, 54 and 56 includes respective track elements 62, 64 and 66. The track elements 62, 64 and 66 can be implemented according to any known encoder technology, such as disclosed herein.

In the example of FIG. 2, two or more of the track elements 62, 64, 66 are configured with nonlinear modulation. For instance, one track can be a reference track that includes nonmodulated track elements 62 while the other tracks include sets of track elements 64 and 66 that are nonlinearly modulated relative to the first set of track elements. The track elements 64 and 66 can be configured with the same type of modulation but offset by a predetermined amount. Alternatively, different types of non-linear modulation can be utilized for each of the track elements 64 and 66. For example, each the track elements 64 and 66 can be configured with dimensions that vary along the surface of the respective tracks 52 and 54 in a predetermined manner (e.g., a single modulation period) over one mechanical revolution (360° m).

A sensor 68, 70 and 72 is positioned adjacent to each of the tracks for sensing the track elements 62, 64 and 66 in the respective tracks 52, 54 and 56. The sensors 68, 70, 72 are configured to sense the track elements or changes in sensed characteristics of the track elements, which rotate commensurate with rotation of the shaft 58. The sensors 68, 70 and 72 provide sensor signals that represent movement and position of the track elements 62, 64 and 66 for each of the tracks 52, 54 and 56. The modulation in the track elements 62, 64, 66 is thus encoded in the respective sensor signals.

The sensors signals can be digitized and provided to a calculator 74 that is programmed to compute an indication of the angular position of the shaft based on the information provided by the sensor signals. That is, each of the sensors 68, 70 and 72 provides information corresponding to position and/or rotation of the track elements about the axis 55. For example, each of the track elements 64 and 66 can be dimensioned and configured with a predetermined nonlinear modulation (e.g., sinusoidal and cosinusoidal) in the circumferential direction. The track elements 62 of the other track 52, being reference track, can be non-modulated. Since the modulation of the track elements 64 and 66 is known relative to the non-modulated track elements 62, which relative modulation can be quantified (e.g., as a constant or variable), the calculator 74 can be preprogrammed to compute the angular position of the shaft 58 based on the sensor signals, such as disclosed herein.

Those skilled in the art will understand and appreciate that the calculations can further vary depending on the type of encoder technology being utilized and the particular modulation that is implemented in each of the tracks. It will be understood that with the addition of another track in the example of FIG. 2 (as compared to the example of FIG. 1), an additional sensor can be omitted from each of the tracks yet still compute an indication of absolute angular position. Thus, the cost of implementing more tracks (e.g., in the example of FIG. 2) or more sensors (e.g., in the example of FIG. 1) can be balanced to determine a desirable configuration for a given application.

Figure 3:
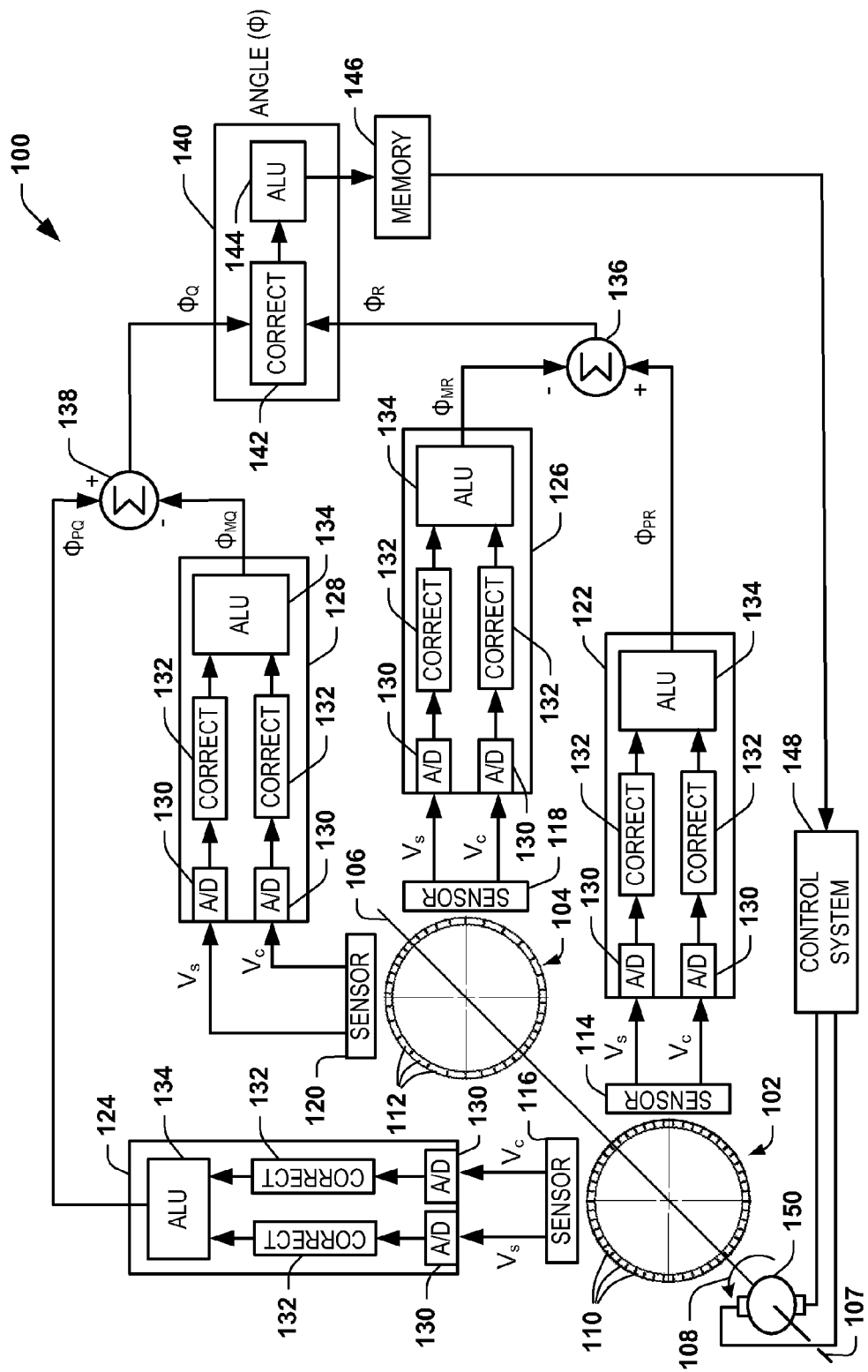
FIG. 3 depicts yet another example embodiment of an encoder system.

By way of further example, FIG. 3 depicts an example of an encoder system 100 implemented as a magnetic rotary through-bore or hollow-shaft encoder. As described herein, the architecture and functionality demonstrated with respect to FIG. 3 is applicable to various types of encoder technologies, including other types of magnetic encoders, optical encoders, and mechanical encoders.

In the example of FIG. 3, the system 100 includes annular tracks 102 and 104 mounted to rotate with a rotary shaft 106 that can rotate about an axis 107 in a direction, indicated at 108. The track 102 includes a set of track elements 110 arranged circumferentially about the axis 107. The track 104 also includes a set of track elements 112 arranged circumferentially about the axis 107. In the example of FIG. 3, the track elements 110 can be considered "pure" since they have constant size and thus no modulation. The track elements 112 of the other track 104 are modulated nonlinearly in their circumferential configuration, such as according to a sinusoidal or cosinusoidal function. Other types of nonlinear modulation can also be utilized for the track elements 112.

As an example, the track 102 can be implemented as a standard incremental encoder magnetic track in which the track elements 110 consist of a predetermined number (N) of magnetic poles. As mentioned above, in this example, it is assumed that the magnetic poles forming the track elements 110 are not modulated. That is, each pole has the same arc length. The other track 104 can be configured similarly in that it has the same number (N) of track elements 112 implemented as magnetic poles like the track 102, but the magnetic poles forming its track elements 112 are nonlinearly modulated. This nonlinear modulation causes the alignment of the poles on the modulated track 104 to vary relative to the poles on the non-modulated track 102 as the shaft 106 rotates about its axis 107. For example, the modulation can be implemented such that the track elements 112 in the modulated track vary relative to the track elements 110 in the pure track in a sinusoidal manner over one period for each mechanical revolution (360° m).

In the example of FIG. 3, the system 100 also includes sensors 114, 116, 118 and 120 positioned for sensing respective track elements. With the track elements 110 and 112 implemented as magnetic poles, the sensors can be implemented as Hall Effect or MR sensors. For purposes of the following example, however, it is assumed that the sensors are MR sensors. Two MR sensors 114, 116 and 118, 120 are provided for each track 102 and 104. For example, sensors 114 and 118 are each positioned relative to the shaft 106 at a given reference (R) position (e.g., corresponding to 0° mechanical, i.e., 0° m). The other sensors 116 and 120 are positioned at a predetermined angular position relative to each of the references sensors 114 and 118, such as at a quadrature (Q) position that is 90° m relative to the reference sensors. Each of these four sensors 114, 116 and 118, 120 can be configured to produce a complete sine (Vs) and cosine (Vc) wave for each track element (e.g., each of the poles) 110 and 112 on its respective track.

The system 100 also includes hardware and/or software to compute the angular position of the shaft 106 based on the sensor signals provided by the respective sensors 114, 116, 118 and 120. In the example of FIG. 3, the sensors 114, 116, 118 and 120 feed their sine and cosine signals into respective calculators 122, 124, 126 and 128. Each calculator 122, 124, 126 and 128 can be configured to generate a corresponding signal representing an electrical angle within an adjacent track element (e.g., pole) of the respective track 102 and 104 being sensed by the specific sensor. The electrical angles can be computed based on an arc tangent operation performed by the respective calculators 122, 124, 126 and 128 based on the sensor output signals Vs and Vc. Each of the calculators 122, 124, 126 and 128 thus corresponds to means for computing an electrical angle for each track element 110, 112 that is detected by respective sensors 114, 116, 118 and 120.

The calculators 122, 124, 126 and 128 can be implemented as hardware (e.g., analog and/or digital circuitry, such as one or more ALU or other circuitry), software or a combination of hardware and software. In the example of FIG. 3, each of the calculators 122, 124, 126 and 128 includes analog-to-digital converters 130 configured to convert the analog sensor output signals Vs and Vc (e.g., analog electrical signals) to a digital representation thereof. Correction blocks 132 can adjust (e.g., by implementing offset and/or gain compensation) each of digital sensor output signals Vs and Vc. While correction blocks 132 are demonstrated for each sensor signal channel, it will be appreciated that the correction can be performed on a comparative basis based on the characteristics of the sensors signals Vs and Vc for each sensor 114, 116, 118 and 120. For example, the correction block 132 can further normalize the pair of sensor signals relative to each other to facilitate the computing an electrical (pole) angle for a given track element. Those skilled in the art will appreciate various types of correction that can be implemented via the corrections blocks to compensate for errors and variations in sensor circuitry and other noise that may exist in practical applications to facilitate calculating the electrical angles for each sensor 114, 116, 118 and 120.

Each of the calculators 122, 124, 126 and 128 also include an arithmetic logic unit (ALU) 134 configured to compute the electrical angles for each track element being sensed based on the corrected sensor signals. For instance, each ALU 134 can be implemented as digital circuitry and/or logic configured to perform a predetermined mathematical operation, such as an arc tangent function, based on the digitized and corrected sensor signals. Thus, each of the calculators 122, 124, 126 and 128 provides an output representing an electrical angle for a given track element, which outputs collectively are related to the angular position and rotation of the shaft 106.

In the example of FIG. 3, the outputs of each of the calculators 122, 124, 126 and 128 can be designated as $\Phi_{XY}$ where the subscript X denotes the track which the sensor senses (P or M) and the subscript Y denotes the relative mechanical position of the sensor (R or Q). Thus, for example, $\Phi_{PR}$ is the polar angle of the pure (P) track 102 as sensed by the reference (R) sensor 114, $\Phi_{MQ}$ is the polar angle of the modulated (M) track 104 as sensed by the quadrature (Q) sensor 120, etc.

In view of the foregoing nomenclature, if θ is the mechanical angle of rotation (measured in radians) of the two tracks 102 and 104 about their common axis 107, then the output of the calculators (e.g., performing an arc tangent operation) 122, 124, 126 and 128 can be expressed as follows:

$$\Phi_{PR} = N\theta \qquad \text{Eq. 1}$$

$$\Phi_{PQ} = N\left(\theta + \frac{\pi}{2}\right) \qquad \text{Eq. 2}$$

$$\Phi_{MR} = N(\theta - \mu\sin\theta) \qquad \text{Eq. 3}$$

-continued $$\Phi_{MQ} = N\left(\theta + \frac{\pi}{2} - \mu\sin\left(\theta + \frac{\pi}{2}\right)\right) = N\left(\theta + \frac{\pi}{2} - \mu\cos\theta\right) \qquad \text{Eq. 4}$$

where μ represents a modulation constant for modulation of the modulated track 104 relative to the non-modulated track 102.

Figure 4:
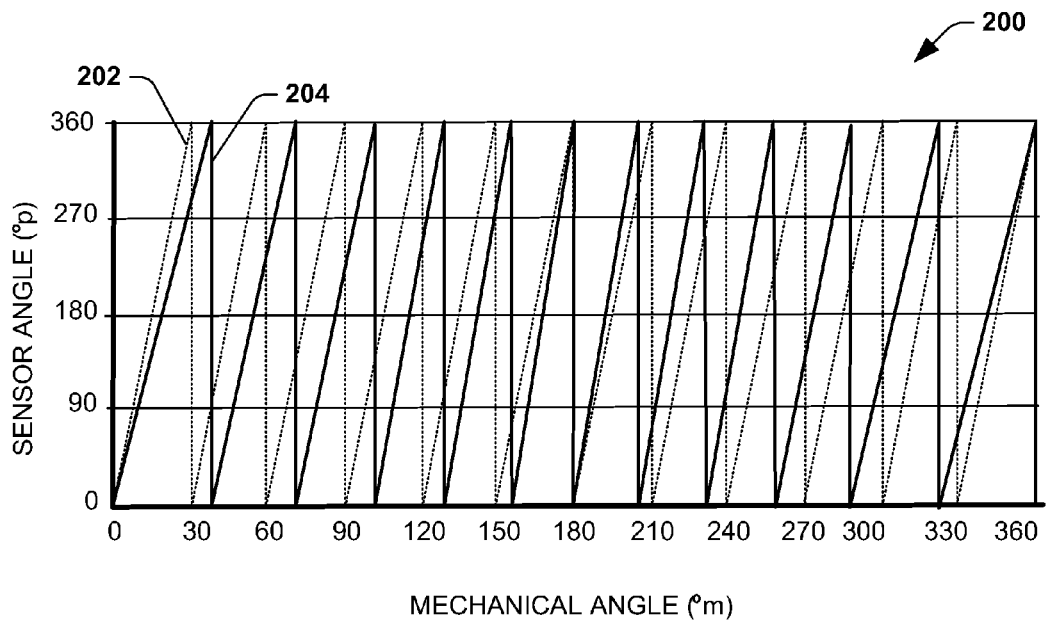
FIG. 4 depicts an example of a graph of sensor angle plotted as a function of a mechanical angle according to an example embodiment.

FIG. 4 is a graph 200 demonstrating the relationship between sensor angle representing the electrical angle for each pole (denoted ° p) and the mechanical angle of the shaft (denoted ° m), such as can be provided by the calculators described with respect to FIG. 3. The example graph 200 of FIG. 4 demonstrates the relationship between the output of a reference sensor for a non-modulated track, indicated at 202 via dotted lines, and the output of a sensor for a modulated track, indicated at 204. The plot 202 for the non-modulated track includes evenly spaced cycles over a complete mechanical revolution (360° m) of the shaft. By comparison, the plot 204 for the modulated track exhibits the same number of cycles over 360° m, however, these cycles are not evenly spaced. The spacing of the cycles in the plot 204 for the modulated track corresponds to the nonlinear modulation in the spacing of the track elements (e.g., magnetic poles) detected by the sensor. In the example modulation, the modulated track output leads the non-modulated track output over the first half of the revolution (e.g., from 0° m to 180° m), and lags the pure track output over the second half of the revolution (e.g., from 180° m to 360° m) due to the nonlinearly modulated track elements (e.g., having sinusoidal modulation). Other forms of non-linear modulation would provide for different relationships between sensor signals. Thus, for each given mechanical revolution, each of the sensors provides the same number of cycles, but the cycles are incrementally different according to the nonlinear modulation implemented for the track elements on the modulated track.

As mentioned above, the example graph 200 demonstrates the relationship between outputs of reference sensors in an encoder system. The same sort of relationship exists for the quadrature sensors for each of the non-modulated and modulated tracks. However, due to the quadrature positioning of such sensors (e.g., being arranged 90° m relative to the reference sensors), the modulation exhibits a cosinusoidal characteristic. While the example in FIG. 4 demonstrates sensor outputs for twelve pole tracks, those skilled in the art will understand and appreciate that any number of poles (greater or lesser than twelve) can be utilized.

Returning to the example of FIG. 3, the system 100 is configured to perform additional mathematical operations for use in deriving the angular position of the shaft 106. For instance, the system 100 employs respective difference components 136 and 138. Each difference component 136, 138 is configured to subtract a modulated track output from the non-modulated track output for the respective sensor pair (reference and quadrature). The difference components 136 and 138 can be implemented as hardware (e.g., ALUs, subtraction circuitry, executable instructions in a processor, digital circuitry or the like). The difference components 136 and 138 thus provide means for recovering the original modulation at each of the reference and quadrature positions to provide respective reference and quadrature outputs to an output calculator 140.

For example, from Equations 1-4, the relative modulation for each of the reference (R) and quadrature (Q) positions, which can be computed by difference components 136 and 138, can be expressed as follows:

$$\Phi_R = \Phi_{PR} - \Phi_{MR} = N\theta - N(\theta - \mu\sin\theta) = N\mu\sin\theta \qquad \text{Eq. 5}$$

$$\Phi_Q = \Phi_{PQ} - \Phi_{MQ} = N\left(\theta + \frac{\pi}{2}\right) - N\left(\theta + \frac{\pi}{2} - \mu\cos\theta\right) = N\mu\cos\theta \qquad \text{Eq. 6}$$

Figure 5:
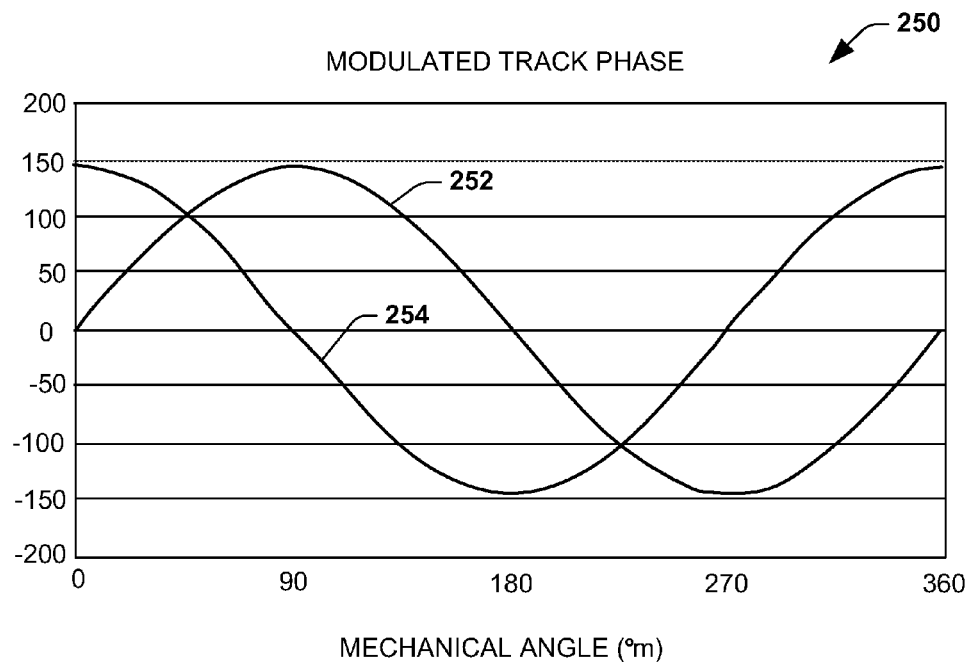
FIG. 5 is a graph depicting a modulated track phase relationship in which the sensor angle is plotted as a function of the mechanical angle for reference and quadrature positions according to an example embodiment.

An example relationship in the modulation of the modulated track as sensed by the sensor pair at the reference and quadrature positions is demonstrated in graph 250 in FIG. 5. In the example of FIG. 5, the graph 250 demonstrates a first waveform 252, such as derived from the signals provided by sensors at the reference position (e.g., $\Phi_R$), and a second waveform 254, such as derived from the sensors at the quadrature position (e.g., $\Phi_Q$).

The output calculator 140 is configured to compute an absolute angular position $\Phi$ of the shaft 106 as a function of the outputs from the subtractor components 136 and 138. Thus, the output calculator can correspond to means for computing the absolute angular position based on the electrical angles computed by each of the electrical angle calculators 122, 124, 126 and 128. The output calculator 140 can include a correction block 142 that is configured to correct errors in the respective reference and quadrature signals provided by the difference components blocks 136 and 138. For instance the correction block can normalize the signals $\Phi_R$ and $\Phi_Q$ (e.g., via phase and amplitude adjustments) relative to each other. An ALU 144 is configured to compute the angle $\Phi$ of the shaft 106 based on the corrected reference and quadrature signals. As an example, the ALU 144 can be configured to perform an arctangent calculation such as follows:

$$\Phi = \tan^{-1}\left[\frac{\Phi_R}{\Phi_Q}\right] = \tan^{-1}\left[\frac{N\mu\sin\theta}{N\mu\cos\theta}\right] = \tan^{-1}[\tan\theta] = \theta \qquad \text{Eq. 7}$$

Equation 7 demonstrates that, under ideal circumstances, the calculated angular position $\Phi$, corresponding to an electrical representation of the mechanical position of the shaft, is equal to the actual angle $\theta$ of the shaft.

The calculated angle can be utilized depending on the type of system 100 (e.g., a motor or generator). By way of example, the resulting angle value determined by the calculator 140 can be stored as angle data in memory 146, such as a buffer, a register or other memory structure that may be utilized in the system 100. The corresponding angle data can be utilized by a control system 148, such as for controlling operation of an electrical machine (e.g., a motor or generator), schematically indicated at 150. The electrical machine 150 can be connected to the shaft 106, directly or indirectly. Those skilled in the art will understand and appreciate various configurations that can be utilized for the control system 148, which can vary depending on the electrical machine that is implemented. The control system 148 can include a microcontroller (e.g., analog and/or digital circuitry, such an ASIC or microprocessor) and/or switching network for controlling power provided to or from the electrical machine 150. Thus, the control system 148 may provide means for controlling operation of an electrical machine based on the indication of absolute position.

Additionally, the calculator 140 further can provide the absolute angular position $\Phi$ for transmission and use by the control system according to a desired communication protocol. Alternatively, the system 100 can employ a converter that can be programmed to convert the output angle from the calculator 140 to a desired format, which can be selected in response to a user input. Some examples of known communication protocols in which the calculator 140 (or associated converter (not shown)) can be provide the angular position include parallel binary, SSI, "BiSS", ISI, Profibus, CAN, DeviceNet, CANopen, Endat and Hiperface. Other known and yet-to-be developed communication protocols can also be utilized.

Figure 6:
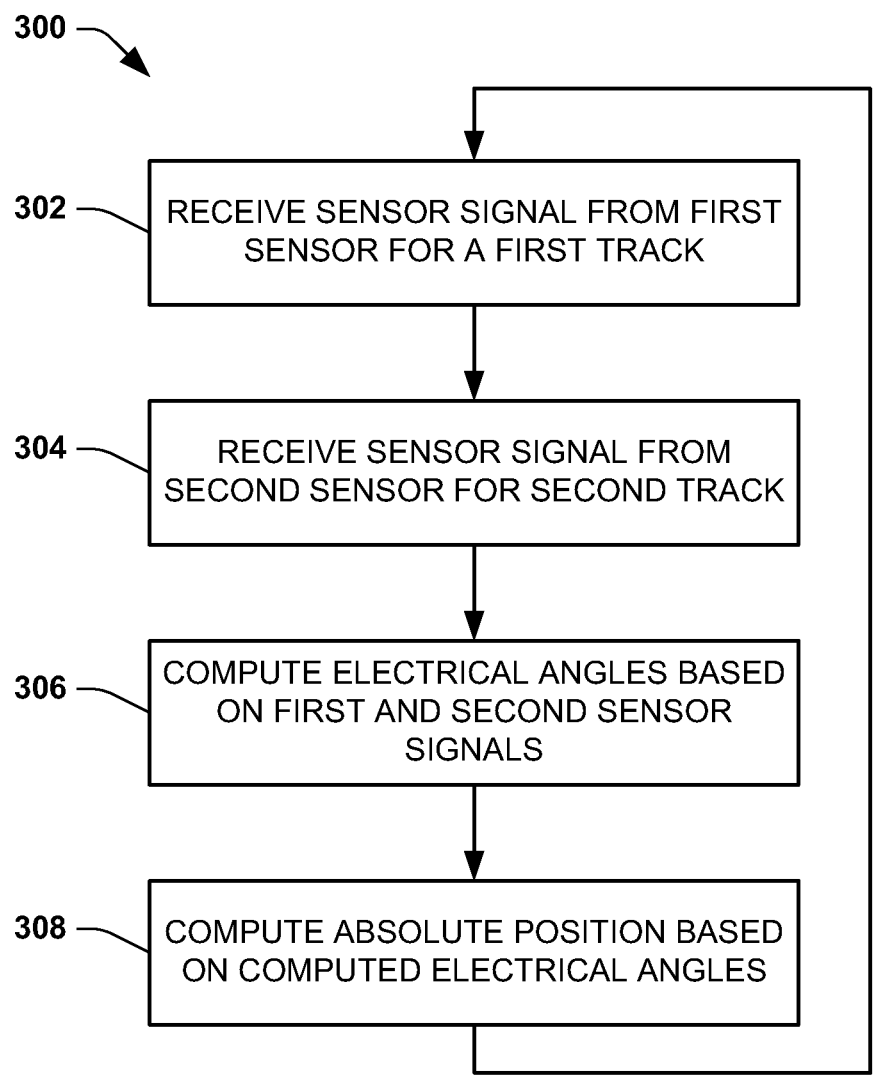
FIG. 6 is a flow diagram depicting an example method for determining absolute position.

In view of the foregoing structural and functional features described above, an example method 300 will be better appreciated with reference to FIG. 6. While, for purposes of simplicity of explanation, the example method 300 of FIG. 6 is shown and described as executing serially, it is to be understood and appreciated that the method is not limited by the illustrated order, as some actions could in other embodiments occur in different orders and/or concurrently from that shown and described herein.

The method 300 of FIG. 6 can be implemented in the context of an encoder system, such as disclosed herein. For example, the encoder system can employ any encoder technology, such as optical, magnetic and/or mechanical encoder technologies. The method of FIG. 6 begins at 302 in which a sensor signal is received from a first sensor for a first track that is coupled for rotation with a shaft. As an example, the sensor signal can be provided as an analog electrical signal that includes sine and cosine signals corresponding to a complete period over the length of each track element detected by the first sensor as the shaft rotates. In some embodiments, more than one sensor can be provided for each track, which sensors can be displaced from each other by a predetermined mechanical angle.

At 304, a sensor signal is received from a second sensor for a second track. The second track can be displaced axially from the first track so as to mitigate interference between tracks and respective sensors. At least one of the tracks is configured with a set of track elements exhibiting a nonlinear modulation along a corresponding surface that is facing the respective sensor. The nonlinear modulation of such track elements, for example, can be periodic such that one complete period extends along the surface over 360° m.

At 306, electrical angles can be computed based on the received sensor signals. As disclosed herein, in the example where multiple sensors (e.g., reference and quadrature sensors) are implemented for each track, the electrical angles can be computed for each sensor position for each track. At 308, an absolute angular position is computed based on the computed electrical angles. As an example, the angular position can be computed via an arc tangent function based on reference and quadrature electrical angle values computed from reference and quadrature sensors for each track. The resulting angular position can be stored in memory and utilized for controlling an electrical machine as is known in the art.

What has been described above are example embodiments. It is, of course, not possible to describe every conceivable embodiment, but one of ordinary skill in the art will recognize that other embodiments are possible. For example, the sensors and calculators can be implemented in the analog domain or the digital domain. The signals can also be provided in a variety of forms (e.g., electrical signals, optical signals) having values consistent with its analog or digital implementation. Accordingly, this disclosure is intended to embrace all embodiments, such as including alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system, comprising:
    a plurality of tracks configured to move relative to a longitudinal axis, each of the plurality of tracks comprising a plurality of track elements arranged along each respective track, the plurality of track elements for at least one modulated track of the plurality of tracks being configured with a nonlinear modulation; and
    at least one sensor positioned adjacent to each of the plurality of tracks for detecting respective track elements thereof, each given sensor being configured to provide a respective sensor signal having a cycle spacing that corresponds to the modulation of the track elements, the respective sensor signal representing at least one of position or movement of the respective track elements relative to the given sensor.

2. The system of claim 1, further comprising a calculator configured to compute an indication of absolute position based on the sensor signals without having to employ an absolute reference marker.

3. The system of claim 2, wherein the longitudinal axis extends through a rotary shaft, each of the plurality of tracks being fixed relative to the shaft for rotation about the longitudinal axis, the track elements for each of the plurality of tracks being configured in a circumferential arrangement along the surface of its respective track, whereby the system comprises a rotary encoder.

4. The system of claim 3, wherein the calculator further comprises:
    a first calculator to compute an electrical angle for each of the respective track elements being detected by each of the plurality to sensors; and
    a second calculator to compute the indication of absolute angular position of the shaft based on the electrical angles computed by the first calculator.

5. The system of claim 4, wherein the electrical angle computed for track elements in each track further comprises a reference electrical angle for each of the plurality of tracks based on signals provided by each sensor located at a reference position and a second electrical angle computed for each of the plurality of tracks based on signals provided by each sensor located at a predetermined mechanical angle relative to the corresponding sensor located at the reference position.

6. The system of claim 4, further comprising
    a second difference component operative to compute a difference between a pair of the second electrical angles; and
    a reference difference component to compute a difference between a pair of the reference electrical angles, the indication of absolute position being determined based on the computed differences.

7. The system of claim 3, further comprising a control system configured to control operation of an electrical machine based on the indication of absolute position, the electrical machine being coupled to the shaft.

8. The system of claim 1, wherein the surface of the plurality of tracks comprises a circumferential surface that rotates relative to each respective sensor.

9. The system of claim 1, wherein the track elements comprise magnetic poles.

10. The system of claim 1, wherein each of the track elements comprise either an optical pattern or a mechanical pattern.

11. The system of claim 1, wherein the nonlinear modulation comprises a sinusoidal modulation.

12. The system of claim 11, wherein the circumferential length of the track elements in the modulated track decreases in length over a first angular portion of the modulated track and then increases in length over a next angular portion thereof to provide nonlinear modulation over one mechanical period.

13. A system comprising:
    means for sensing one of position or movement of track elements of a first track and for providing a first sensor signal having a cycle spacing that corresponds to a modulation of the track elements of the first track, the first sensor signal representing the position or movement of the track elements, the first track being coupled for movement relative to a longitudinal axis and;
    means for sensing one of position or movement of track elements of a second track and for providing a second sensor signal having a cycle spacing that corresponds to a modulation of the track elements of the second track, the second sensor signal representing the position or movement of the track elements, the second track being coupled for movement relative to the longitudinal axis, the track elements of the second track having a nonlinear modulation that is encoded in the second sensor signal according to movement of the second track relative to the longitudinal axis; and
    means for calculating an absolute position based on the first sensor signal and the second sensor signal.

14. The system of claim 13, wherein the longitudinal axis extends through a rotary shaft, each of the first and second of tracks being fixed relative to the shaft for rotational movement about the longitudinal axis commensurate with rotation of the shaft, the track elements for each of the plurality of tracks being configured in a circumferential arrangement along the surface of its respective track circumscribing the longitudinal axis, such that the absolute position is an absolute angular position.

15. The system of claim 14, wherein the means for calculating further comprises:
    means for computing an electrical angle for each track element detected by each of the means for sensing; and
    means for computing the absolute angular position based on the electrical angles computed by each of the means for computing an electrical angle.

16. The system of claim 13, wherein the nonlinear modulation of the second track comprises a sinusoidal modulation.

17. The system of claim 16, wherein the circumferential length of each track element in the second track is modulated so as to decrease in length over a first portion thereof the second track and then increase in length over a next portion thereof.

18. The system of claim 13, further comprising means for controlling operation of an electrical machine based on the indication of absolute position.

19. A method for determining absolute position comprising:
    receiving a first sensor signal from a first sensor arranged for detecting one of rotation or position of track elements arranged on a first track that is coupled for rotation with a shaft, the first sensor signal having a cycle spacing that corresponds to a modulated spacing of the track elements of the first track;
    receiving a second sensor signal from a second sensor arranged for detecting one of rotation or position of other track elements arranged on a second track that is coupled for rotation with the shaft, the second sensor signal having a cycle spacing that corresponds to a modulated spacing of the other track elements of a second track, the track elements of at least one of the first and second tracks exhibiting a nonlinear modulation along a corresponding surface that is facing the respective sensor; and computing an indication of the absolute angular position of the shaft based on the received first and second sensor signals.

20. The method of claim 19, further comprising computing an electrical angle for each track element detected by the first and second sensors; and computing the absolute angular position based on the computed electrical angles.

21. The system of claim 1, wherein each of the plurality of tracks includes the same number of track elements.

22. The method of claim 19, wherein each of the first and second tracks includes the same number of track elements.

* * * * *